United States Patent [19]

Williams

[11] Patent Number: 5,069,407
[45] Date of Patent: Dec. 3, 1991

[54] MOUNTING BRACKET FOR COMMUNICATION RELATED DEVICES

[76] Inventor: Andy C. Williams, 4251 Lorrain St., Shingle Springs, Calif. 95682

[21] Appl. No.: 608,282

[22] Filed: Nov. 2, 1990

[51] Int. Cl.[5] .................................. A47B 96/06
[52] U.S. Cl. .................... 248/221.3; 379/454
[58] Field of Search ............ 248/223.3, 225.2, 224.4, 248/221.3, 222.2; 379/417, 419, 446, 454, 455; 224/42.45 R

[56] References Cited

U.S. PATENT DOCUMENTS

| | | | |
|---|---|---|---|
| 2,587,912 | 3/1952 | Simpson | 248/222.2 X |
| 4,500,943 | 2/1985 | Greene | 248/221.3 X |
| 4,522,310 | 6/1985 | Mikic | 248/221.3 X |
| 4,584,436 | 4/1986 | Boenning | 379/454 X |
| 4,609,790 | 9/1986 | Kaiwa | 379/445 |
| 4,741,033 | 4/1988 | Utoh | 379/454 |
| 4,782,526 | 11/1988 | Uchino | 379/419 |
| 4,813,642 | 3/1989 | Matsui | 248/221.3 |
| 4,907,265 | 3/1990 | Uchino | 379/417 |

FOREIGN PATENT DOCUMENTS 61-01059  2/1986  Japan ........................ 379/445

*Primary Examiner*—J. Franklin Foss
*Attorney, Agent, or Firm*—James M. Ritchey

[57] ABSTRACT

A mounting bracket for reversibly installing a cellular phone or related device in a vehicle is disclosed. More particularly, the subject device has a body that separates into two components. A first component is directly or indirectly anchored to the vehicle and incorporates one half element of a two element hinge and an alignment pin into its structure. Associated with a second component, that is fastened to the cellular phone device, is the other hinge half element that detachably joins to the first component hinge half element and an aperture to receive the alignment pin. To secure the two components to one another to generate a stable mounting bracket, a second component latch releasably holds a first component catch.

16 Claims, 4 Drawing Sheets

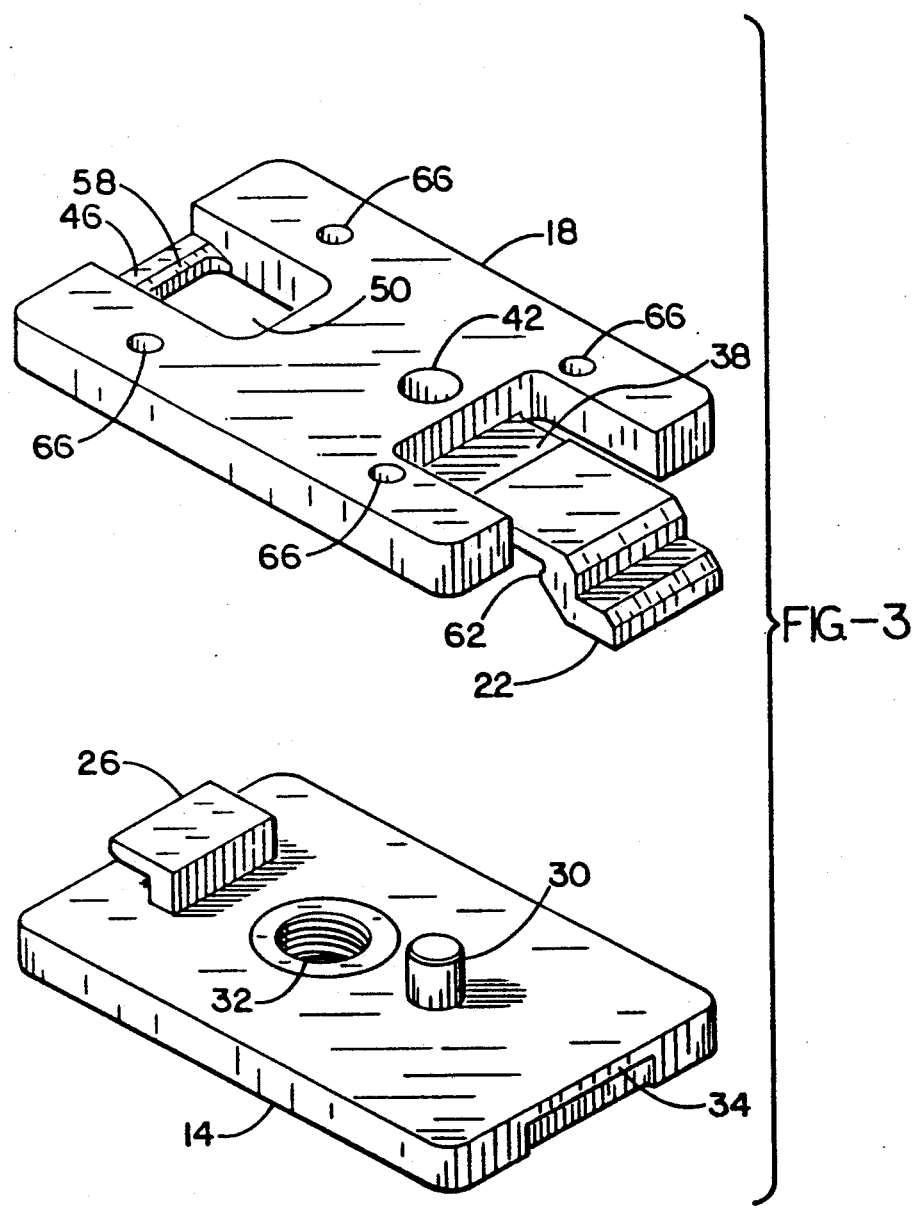

MOUNTING BRACKET FOR COMMUNICATION RELATED DEVICES

BACKGROUND OF THE INVENTION

1. Field of the Invention

A mounting bracket for reversibly installing a cellular phone or related device in a vehicle is disclosed. When a user desires to utilize the phone, the user applies the necessary force to the mounting bracket and the phone is released. More particularly, the subject device comprises a two component body having a first component, anchored to the vehicle, that is detachably mated to a second component, fastened to the phone, by means of a first component to second component detachable hinge and a second component latch that releasably holds a first component catch. To aid in aligning the two components when mated together, a first component alignment pin and second component pin receiving opening are provided.

2. Description of the Background Art

The prior means of securing a cellular phone or related device to a vehicle are limited primarily to traditional methods of attachment of one object to another, including VELCRO ® type couplings, snaps, magnets, simple hooking or clipping means, and the like. These prior approaches lack a firm, unintentional release resistant association between the mounted device and the vehicle. The subject invention overcomes these prior drawbacks. With the subject invention, the device to be mounted may be easily attached and intentionally released from the vehicle, but the likelihood of accidental release is decreased.

One marketed product includes two components that are secured to one another by a single point of attachment that is a flanged, bayonet-like projection from one component that is gripped by a spring loaded clasp on the other component. The bayonet fitted component is secured to a cellular phone, while the clasp including component is secured to the vehicle.

SUMMARY OF THE INVENTION

An object of the present invention is to provide a vehicle mounting bracket that is easily dissociated into one component that remains anchored to the vehicle and a second component that is fastened to a cellular phone or related device.

An additional object of the present invention is to generate a structurally solid vehicle mounting bracket for a cellular phone related device that contains few components and is inexpensive to manufacture.

A further object of the present invention is to create a vehicle mounting bracket for a cellular phone related device that is easy to operate, yet securely anchors the phone into a desired location within the vehicle.

Yet one more object of the present invention is to make a vehicle mounting bracket for a cellular phone related device that resists normal use separation except by the correct application of force to the bracket's latch.

The subject device comprises a mounting bracket for reversibly installing a cellular phone or related device in a vehicle. A generally flattened first bracket component or plate has a perimeter edge incorporating proximate this edge both a first half element of a releasable hinge means and a first half of a releasable latch means. Further comprising the subject invention is a generally flattened second bracket component or plate having a perimeter edge incorporating proximate this second edge both a second half element of the releasable hinge means and a second half of the releasable latch means. When the first and said second hinge means are coupled, the first and second latch means engage to releasable secure the first and second bracket components into the whole subject device. Means for aligning and stabilizing the first bracket component with the second bracket component, when the first and second bracket components are coupled by the hinge means and engaged by the latch means, are included. Additionally comprising the subject device are means for anchoring the first bracket component to the vehicle and means for anchoring the second bracket component to the cellular phone or related device.

Other objects, advantages, and novel features of the present invention will become apparent from the detailed description that follows, when considered in conjunction with the associated drawings.

BRIEF DESCRIPTION OF THE DRAWINGS

FIG. 3 is a perspective view of the subject device showing both the first and second bracket components.

DESCRIPTION OF THE PREFERRED EMBODIMENT

Figure 1:
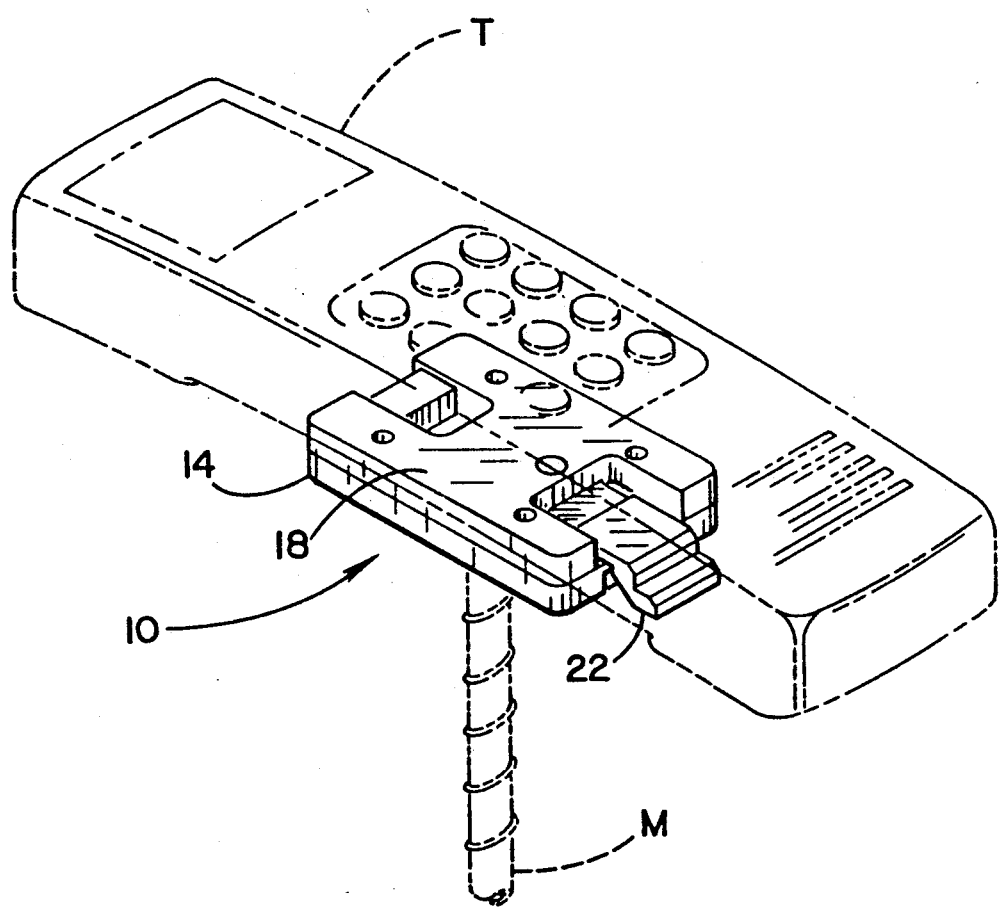
FIG. 1 is a perspective view of the subject device showing a vehicle mounting cable and an associated cellular phone.

Referring now to FIGS. 1-9, there is shown a preferred embodiment of a mounting bracket 10 for reversibly securing an electronic device to a supporting surface. Preferably, the supporting surface is provide by a structural portion of a vehicle (i.e.; a transmission housing, wall panel, ceiling panel, floor panel, or the like). The electronic device is usually a cellular phone T or related device mounted via a supporting flexible cable or mast M to the interior of a vehicle, but may be any suitable apparatus that requires mounting within a vehicle or even on a stationary object (i.e.; radar detection units, sound recording equipment, generally utility fixtures, and equivalent appliances). FIG. 1 illustrates a typical application for the subject device 10, wherein a the flexible cable or mast M is anchored to a first, usually lower, bracket component or plate 14. The cellular phone T is fastened to a second, usually upper, bracket component or plate 18. Together, releasably hinged and latched when installed in the vehicle, the first 14 and second 18 bracket components comprise the subject device 10.

Figure 2:
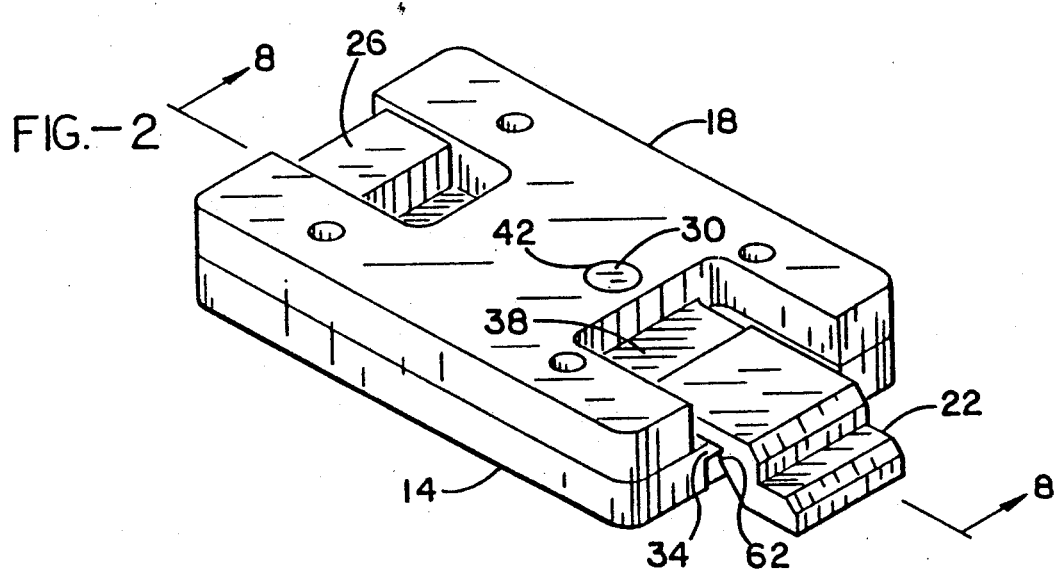
FIG. 2 is a perspective view of the subject device.
Figure 4:
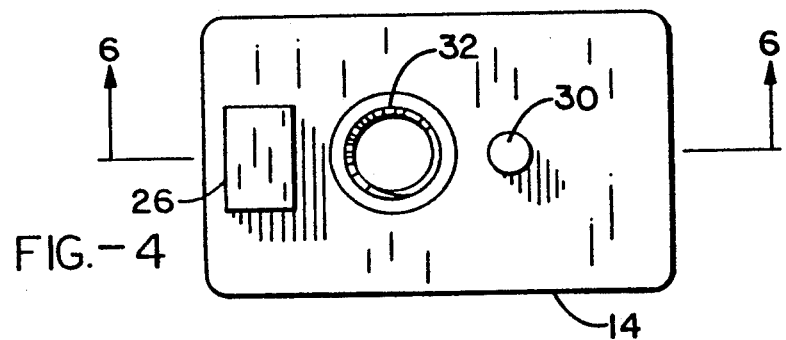
FIG. 4 is a top view of the first bracket component.
Figure 5:
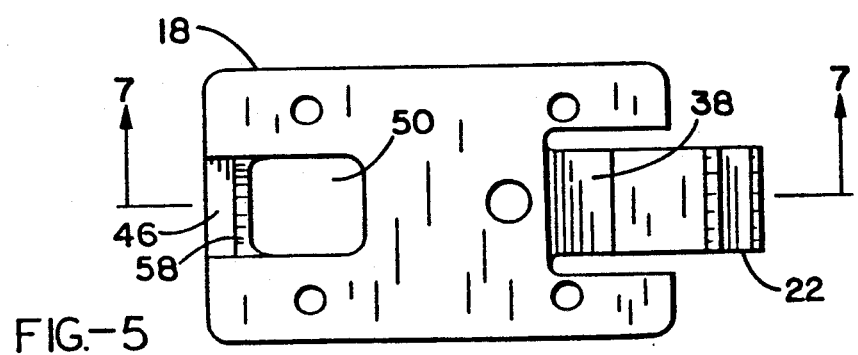
FIG. 5 is a top view of the second bracket component.
Figure 6:
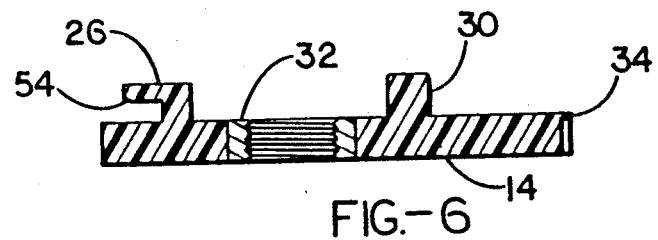
FIG. 6 is a cross sectional view of the first bracket component taken along line 6—6 of FIG. 4.
Figure 7:
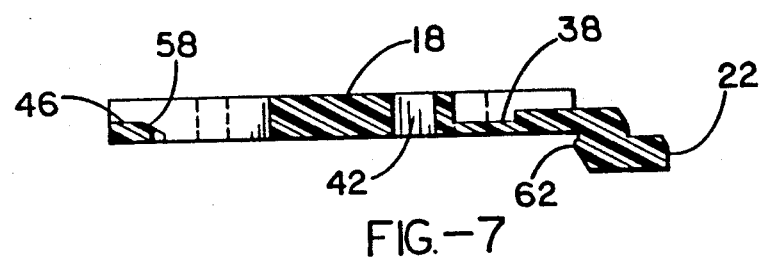
FIG. 7 is a cross sectional view of the second bracket component taken along line 7—7 of FIG. 5.

FIG. 2 reveals the subject device 10 in its mated form with the first bracket component 14 releasably hinged to the second bracket component 18. It should be understood that even through the subject device 10 is depicted as having a generally flattened, rectangular form, other shapes that function is a like manner are within the realm of this disclosure.

As shown in FIG. 3, the subject device has been separated into its two bracket components 14 and 18. Generally, the first bracket component 14 has upper and lower surfaces and a perimeter edge. Projecting from the upper surface of the first bracket component 14 are a first hinge element 26 and an alignment pin 30. Either fitted into the lower surface of the first bracket component 14 or completely penetrating the first bracket component 14 (as specifically illustrated in FIG. 3) is a means for anchoring the first bracket component 14 to the vehicle. Preferably, the anchoring means comprises a threaded attachment point ring 32 that mates with the complementary threaded end of the flexible cable M or other threaded apparatus. Other equivalent means and mechanisms are equally acceptable for anchoring the first bracket component 14 to the supporting surface. Associated with the perimeter edge of the first bracket component 14 is a catch 34 for reversible mating with the latch 22 on the second bracket component 18.

Generally, and indicated above in FIG. 3, the second bracket component 18 also has upper and lower surfaces and a perimeter edge. Clearly, projecting from the second bracket component perimeter edge is the latch 22. A resilient arm or segment 38 of the latch 22 attaches to the remainder of the second bracket component 18. Either partially or completely (as illustrated) penetrating the second bracket component 18 is an alignment pin receiving aperture 42. Opposing the latch 22, associated with the second bracket component 18 perimeter edge is a second hinge element 46 and a first hinge element 26 receiving passage 50.

Normally, means are provided for: 1) releasably hinging the first bracket component 14 to the second bracket component 18; 2) releasably latching the first bracket component 14 to the second bracket component 18; 3) anchoring the first bracket component 14 to the supporting surface; and 4) fastening the second bracket component 18 to the cellular phone of related device. Further, means are usually furnished for aligning and stabilizing the mated first 14 and second 18 bracket components.

More specifically, the hinge assembly that releasably connects the first 14 and second 18 bracket components comprises the first hinge element 26 (see FIGS. 2, 3, 4, 5, 8, and 9) and the second hinge element 46 (see FIGS. 3, 5, 7, 8, and 9). As seen especially well in cross sectional FIG. 6, the first hinge element 26 extends from the upper surface of the first bracket component 14 to generate a male hook in the approximate shape of an inverted "L". This male hook is inserted within a female receiver or hinge receiving passage 50 in the second bracket component 18 and encounters the second hinge element 46. To aid in sliding the male hook over the second hinge element 46, the initial contacting surfaces of each 54 and 58 as usually angled (this orientation is seen particularly in FIG. 9). When the male and female portions of the hinge are contacted, the second bracket component 18 is pivoted toward the first bracket component 14 along the path noted by "C" in FIG. 9 to generate the latched final form of the subject invention as seen in particular in FIG. 8.

Comprising the means for releasably latching the two bracket components is the resilient latch 22 associated with the second bracket component 18 and the catch 34 associated with the first bracket component 14. The latch 22 is designed to reversibly engage a portion of the first bracket component 14. By engaging the resilient latch 22 with the catch 34 the secured subject device assembly is generated (see FIGS. 1, 2, and 8). The catch 34 is either a slight lip or ledge protruding from the first bracket component edge or a detect, undercut, or indentation aligned to mate with the second bracket component latch 22. The arm or segment 38 resiliently attached the latch 22 to the remainder of the second bracket component 18. Extending from the latch arm is a securing talon 62 that engages the catch 34. Looking at FIG. 9, when the second bracket component 18 is hinged and pressed together (along motion line "C") with the first bracket component 14, the resilient arm 38 flexes or bends slightly to allow the talon 62 to snap over the catch 34, thereby securing the closed form the subject device. The talon 62 extends into or under the catch 34. When the user desires to separate the first 14 and second 18 bracket components, a lifting force (directed away from the first component 14 and toward the second component 18) is exerted on the latch 22 (usually by a user's finger or thumb) and the talon 62 releases the catch 34. The device's two halves are then separated. Once the releasing force is removed, the resilient arm 38 of the latch 22 immediately returns to its original position.

To permit the fabrication of the resilient arm 38, the subject device is preferably constructed from a solid and firm, yet if made thin enough, resilient polymer material by standard techniques. The exact form of each component is produced by an appropriate means such as molding, milling, and the like. Even through the second bracket component 18 is customarily formed from one piece of material, the resilient arm may be a metallic leaf spring inserted between a second component body and a latch.

Figure 8:
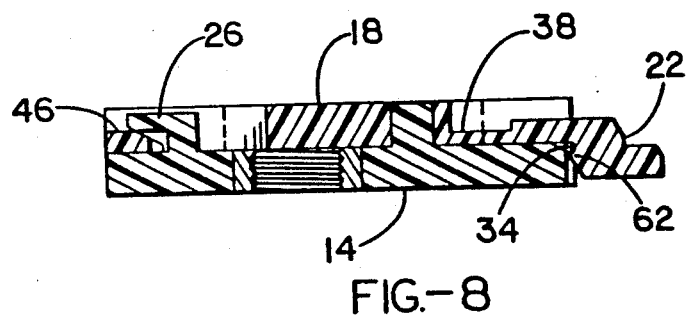
FIG. 8 is a cross sectional view of the subject invention taken along line 8—8 of FIG. 2 and showing both bracket components in a closed or latched state.
Figure 9:
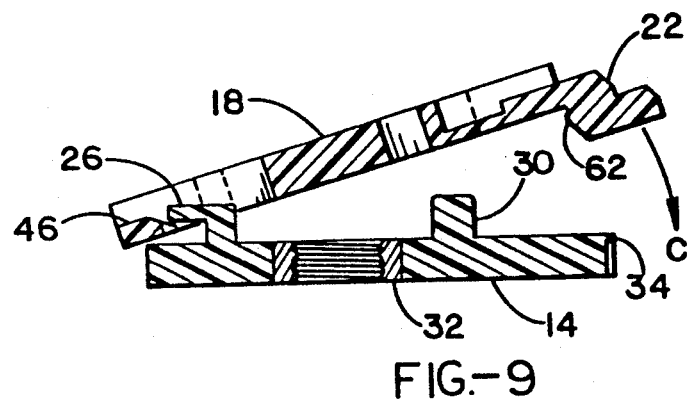
FIG. 9 is a cross sectional view of the subject device as viewed in FIG. 8, except this view shows both bracket components in an opened or non-latched state.

When the two bracket components are secured together at one end by the two element hinge and at the other end by the latch, the mated two are firmly fitted to one another. However, to strength further the alignment and to increase the rigidity of the association of the two bracket components, additional aligning and stabilizing means are usually included. A pin and receiving aperture system is incorporated into the subject device. Although the pin and receiving aperture may be positioned with either element in either bracket component, the preferred configuration is having the alignment pin 30 projecting from the first bracket component 14, proximate the catch 34 containing edge and the alignment pin receiving aperture 42 in the second bracket component 18 proximate the resilient arm 38. As depicted in FIGS. 8 and 9, when the second bracket component 18 is mated with the first bracket component 14, the pin 30 enters the aperture 42. Once the pin 30 and aperture 42 are mated, the overall integrity of the latched configuration is stabilized. It is clear that the pin need not project entirely through the second bracket component 18 (as is shown in the figures), but may fit within a receiving depression formed into the second component 18, but not completely piercing the second component 18. Preferably, the alignment pin 30 is formed as an integral part of the first bracket component 14, but may be mounted as an additional piece of the first component 14 after the first component 14 is fabricated. Further, the stabilizing the aligning pin-to-aperture configuration is shown in a round form, but other equivalent shapes are acceptable and within this disclosure.

The subject device 10 is intended to be secured or anchored to a supporting surface such as the inside of a vehicle. As indicated above, a convenient method of attachment involves a flexible mast M that has a suitable attachment means for securing the device 10 at one end and a supporting surface attachment means at the other. Usually, the device securing end of the mounting mast M has a threaded portion that engages the attachment point ring 32. If the first bracket component 14 is fabricated from a polymer material, the attachment point ring 32 is preferably a metallic (usually brass of the like) ring, with suitable threads, that is embedded into the first bracket component 14. The ring 32 is fitted into the first component 14 and secured to prevent removal by standard procedures. Should the first component 14 be constructed from metal or other rigid material that would hold securely the mast M, the attachment point ring 32 could be merely a threaded opening in the first component 14.

To fasten the cellular phone or related device to the subject device 10, fastening means are provided in the second bracket component 18. One or more coupling means apertures 66 are provided in the second bracket component 18. Coupling means such as screws, bolts, rivets, and the like are inserted through the apertures 66, into the cellular phone or related device and tightened to fasten the phone or related device to the second component 18.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A mounting bracket for use by a user for reversibly installing a cellular phone or related device to a supporting surface, comprising:
   a) means for releasably hinging a first bracket component to a second bracket component;
   b) means for releasably latching said first bracket component hinged to said second bracket component, wherein said user releases said latching means by application of a finger exerted lifting force directed away from said first bracket component and toward said second bracket component;
   c) means for anchoring said first bracket component to said supporting surface; and
   d) means for fastening said second component to said cellular phone or related device.

2. A mounting bracket according to claim 1, further comprising non-latching means for aligning and stabilizing said first bracket component with said second bracket component.

3. A mounting bracket according to claim 2, wherein said aligning and stabilizing means comprises a non-latching alignment pin associated with said first bracket component and said second bracket component having an alignment pin receiving aperture for mating with said alignment pin to produce said alignment and stabilization.

4. A mounting bracket according to claim 1, wherein said releasable hinge means comprises a first hinge element associated with said first bracket component that releasably coupled with a second hinge element associated with said second bracket component.

5. A mounting bracket according to claim 4, wherein said first hinge element comprises a male hook and said second hinge element comprises a female hook receiver, wherein when said first and said second bracket components are releasably hinged together said male hook is within said female hook receiver.

6. A mounting bracket according to claim 1, wherein said releasable latch means comprises a resilient latch associated with a perimeter edge of said second bracket component and a catch associated with a perimeter edge of said first bracket component, wherein when said resilient latch is engaged with said catch a secured assembly is generated, wherein said user releases said latch means by application of a finger exerted lifting force on said latch directed away from said first bracket component and toward said second bracket component.

7. A mounting bracket according to claim 6, wherein said resilient latch comprises a latching arm resiliently attached to and projecting from said second bracket component, wherein said latching arm has a securing talon that engages said catch to generate said secured assembly.

8. A mounting bracket according to claim 7, wherein said catch comprises a first bracket component edge detent aligned to mate with said second bracket component securing talon.

9. A mounting bracket according to claim 1, wherein said cellular phone or related bracket component a plurality of apertures for receiving coupling means that fasten said cellular phone or related device to said second bracket component.

10. A mounting bracket for use by a user for reversibly installing a cellular phone or related device in a vehicle, comprising:
   a) a generally flattened first bracket component having a perimeter edge incorporating proximate said first bracket component perimeter edge both a first half element of a releasable hinge means and a first half of a releasable latch means;
   b) a generally flattened second bracket component having a perimeter edge incorporating proximate said second bracket component perimeter edge both a second half element of said releasable hinge means and a second half of said releasable latch means, wherein when said first and said second hinge means are coupled, said first and said second latch means engage to releasable secure said first and said second bracket components to one another, wherein said user releases said latching means by application of a finger exerted lifting force directed away from said first bracket component and toward said second bracket component;
   c) non-latching means for aligning and stabilizing said first bracket component with said second bracket component when said first and said second bracket components are coupled by said hinge means and engaged by said latch means;
   d) means for anchoring said first bracket component to said vehicle; and
   e) means for fastening said second bracket component to said cellular phone or related device.

11. A mounting bracket according to claim 10, wherein said aligning and stabilizing means comprises a non-latching alignment pin associated with said first bracket component and said second bracket component having an alignment pin receiving aperture for mating with said alignment pin to produce said alignment and stabilization.

12. A mounting bracket according to claim 10, wherein said first half hinge element comprises a male hook and said second half hinge element comprises a female hook receiver, wherein when said first and said second bracket components are releasably hinged together said male hook is within said female hook receiver.

13. A mounting bracket according to claim 10, wherein said first half of said releasable latch means comprises a catch associated with said first bracket component and said second half of said releasable latch means comprises a resilient latch associated with said second bracket component, wherein when said resilient latch is engaged with said catch a secured assembly is generated.

14. A mounting bracket according to claim 13, wherein said resilient latch comprises a latching arm resiliently attached to and projecting from said second bracket component, wherein said latching arm has a securing talon that engages with catch to generate said secured assembly.

15. A mounting bracket according to claim 14, wherein said catch comprises a first bracket component edge detent aligned to mate with said second bracket component securing talon.

16. A mounting bracket according to claim 10, wherein said cellular phone or related device fastening means comprises within said second bracket component a plurality of apertures for receiving coupling means that fasten said cellular phone or related device to said second bracket component.

* * * * *